United States Patent
Kitakaze

(10) Patent No.: US 10,414,009 B2
(45) Date of Patent: Sep. 17, 2019

(54) MACHINE TOOL AND CONTROL APPARATUS OF THE MACHINE TOOL

(71) Applicant: Citizen Watch Co., Ltd., Tokyo (JP)

(72) Inventor: Ayako Kitakaze, Tokyo (JP)

(73) Assignee: Citizen Watch Co., Ltd, Tokyo (JP)

( * ) Notice: Subject to any disclaimer, the term of this patent is extended or adjusted under 35 U.S.C. 154(b) by 0 days.

(21) Appl. No.: 15/552,943

(22) PCT Filed: Mar. 18, 2016

(86) PCT No.: PCT/JP2016/058671
§ 371 (c)(1),
(2) Date: Aug. 23, 2017

(87) PCT Pub. No.: WO2016/152769
PCT Pub. Date: Sep. 29, 2016

(65) Prior Publication Data
US 2018/0050431 A1    Feb. 22, 2018

(30) Foreign Application Priority Data
Mar. 26, 2015    (JP) .................................. 2015-064469

(51) Int. Cl.
*B23B 1/00*    (2006.01)
*B23Q 15/013*    (2006.01)
(Continued)

(52) U.S. Cl.
CPC ............ *B23Q 15/007* (2013.01); *B23B 25/02* (2013.01); *B23B 27/12* (2013.01); *B23B 27/22* (2013.01);
(Continued)

(58) Field of Classification Search
CPC ......... B23B 27/12; B23B 27/22; B23B 25/02; B23Q 15/007; B23Q 5/22; B23Q 15/013; G05B 19/4093
See application file for complete search history.

(56) References Cited

U.S. PATENT DOCUMENTS 3,174,404 A * 3/1965 Findley .................... B23B 1/00
82/11.1
3,753,384 A * 8/1973 Anfindsen ............... B23B 29/12
310/14
(Continued)

FOREIGN PATENT DOCUMENTS

EP        0792707 A1    3/1997
JP        49-6573    †    1/1974
(Continued)

OTHER PUBLICATIONS

Sannomiya et al., U.S. Appl. No. 15/129,238, filed Sep. 26, 2016 on Control Device for Machine Tool Including Control Device.
(Continued)

*Primary Examiner* — Sara Addisu
(74) *Attorney, Agent, or Firm* — Howson & Howson LLP

(57) ABSTRACT

This invention provides a machine tool that, in addition to sequentially separating a chip generated from a workpiece in a reliable manner, improves the roundness of the finished workpiece and improves the visual appearance and roughness of a machined surface of the workpiece, and a control apparatus of the machine tool. A machine tool or a control apparatus thereof includes a vibration frequency setting unit for setting vibration frequency of the reciprocal vibration with respect to one relative rotation when machining a workpiece so that the intersections of paths of a cutting tool during forward movement and backward movement are dispersed on a circumferential surface of the workpiece.

5 Claims, 8 Drawing Sheets

(51) Int. Cl.
  B23Q 15/007  (2006.01)
  G05B 19/4093 (2006.01)
  B23B 27/12   (2006.01)
  B23B 27/22   (2006.01)
  B23Q 5/22    (2006.01)
  B23B 25/02   (2006.01)

(52) U.S. Cl.
  CPC ............ B23Q 5/22 (2013.01); B23Q 15/013 (2013.01); G05B 19/4093 (2013.01)

(56) References Cited

U.S. PATENT DOCUMENTS

| | | | | |
|---|---|---|---|---|
| 4,203,062 | A * | 5/1980 | Bathen | B23B 29/12 318/39 |
| 4,419,912 | A * | 12/1983 | Sotome | B23B 29/125 82/11.1 |
| 4,646,595 | A * | 3/1987 | Slee | B23B 29/125 318/571 |
| 4,667,546 | A * | 5/1987 | Dombrowski | B23B 25/02 82/104 |
| 5,054,340 | A * | 10/1991 | Sugita | B23Q 1/601 82/118 |
| 5,113,728 | A * | 5/1992 | Medeksza | B23B 25/02 408/1 R |
| 5,291,812 | A * | 3/1994 | Yen | B23B 25/02 408/17 |
| 5,331,870 | A * | 7/1994 | Chin-Long | B23B 25/02 82/1.11 |
| 5,778,745 | A * | 7/1998 | Furusawa | B23B 25/02 451/28 |
| 5,911,802 | A * | 6/1999 | Kimura | B23B 25/02 408/17 |
| 6,202,521 | B1 * | 3/2001 | Rossetti | B23Q 1/34 82/1.11 |
| 7,290,471 | B2 * | 11/2007 | Ehnes | B23B 27/20 82/123 |
| 7,293,487 | B2 * | 11/2007 | Campbell | B23B 27/20 82/123 |
| 7,587,965 | B2 * | 9/2009 | Mann | B23B 25/02 184/6.1 |
| 7,617,750 | B2 * | 11/2009 | Moscoso | B21C 23/001 82/1.11 |
| 7,628,099 | B2 * | 12/2009 | Mann | B22F 9/04 148/308 |
| 8,240,234 | B2 * | 8/2012 | Woody | B23B 1/00 82/1.11 |
| 8,694,133 | B2 * | 4/2014 | Mann | B23B 29/125 700/160 |
| 9,886,022 | B2 * | 2/2018 | Watanabe | B23Q 15/013 |
| 9,975,211 | B2 * | 5/2018 | Hariki | B23B 29/125 |
| 2007/0052326 | A1 * | 3/2007 | Liu | |
| 2007/0095175 | A1 * | 5/2007 | Ostendarp | B23Q 1/34 82/1.11 |
| 2009/0107308 | A1 * | 4/2009 | Woody | B23B 1/00 82/1.11 |
| 2014/0102268 | A1 * | 4/2014 | Hariki | B23B 29/125 82/118 |
| 2017/0304920 | A1 * | 10/2017 | Sannomiya | B23G 3/00 |
| 2018/0050431 | A1 * | 2/2018 | Kitakaze | B23Q 15/007 |

FOREIGN PATENT DOCUMENTS

| | | | |
|---|---|---|---|
| JP | S49-6573 A | | 1/1974 |
| JP | 10-15701 | † | 1/1998 |
| JP | 10-124127 A | | 5/1998 |
| JP | 2001-150201 | † | 6/2001 |
| JP | 2001-150201 A | | 6/2001 |
| JP | 2012-45693 A | | 3/2002 |
| JP | 2002-301601 | † | 10/2002 |
| JP | 2002-301601 A | | 10/2002 |
| JP | 2006-312223 A | | 11/2006 |
| JP | 2012-45693 | † | 3/2012 |

OTHER PUBLICATIONS

Kitakaze et al., U.S. Appl. No. 15/129,242, filed Sep. 26, 2016 on Control Device for Machine Tool and Machine Tool Including the Control Device.

Sannomiya et al., U.S. Appl. No. 15/506,793, filed Feb. 27, 2017 on Machine Tool and Control Apparatus of the Machine Tool.

Sannomiya et al., U.S. Appl. No. 15/512,989, filed Mar. 21, 2017 on Machine Tool and Control Apparatus of the Machine Tool.

Sannomiya et al., U.S. Appl. No. 15/517,101, filed May 5, 2017 on Machine Tool and Control Device of the Machine Tool.

European Patent Office, Extended European Search Report, dated Oct. 16, 2018, European Patent Office, The Hague.

* cited by examiner
† cited by third party

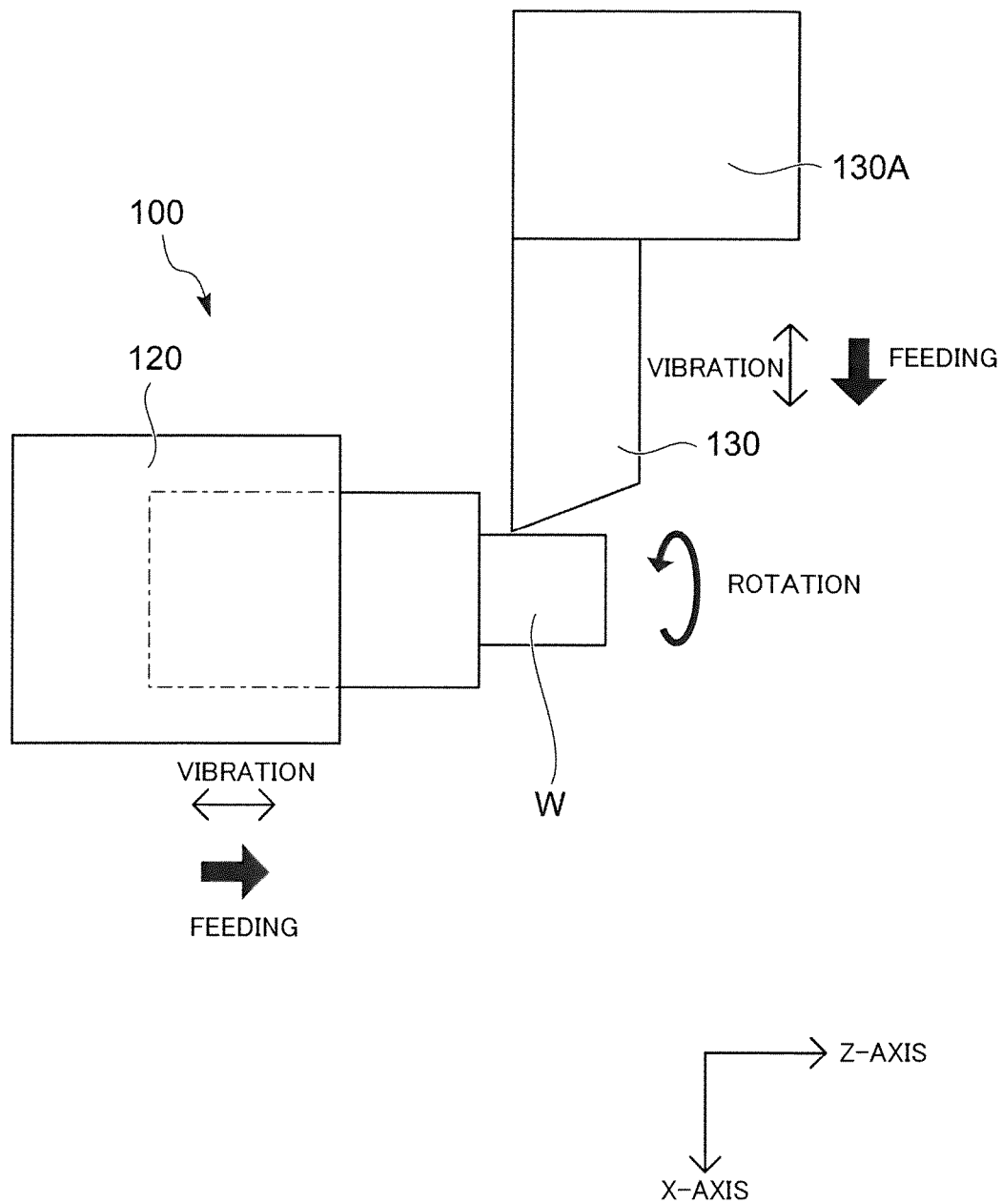

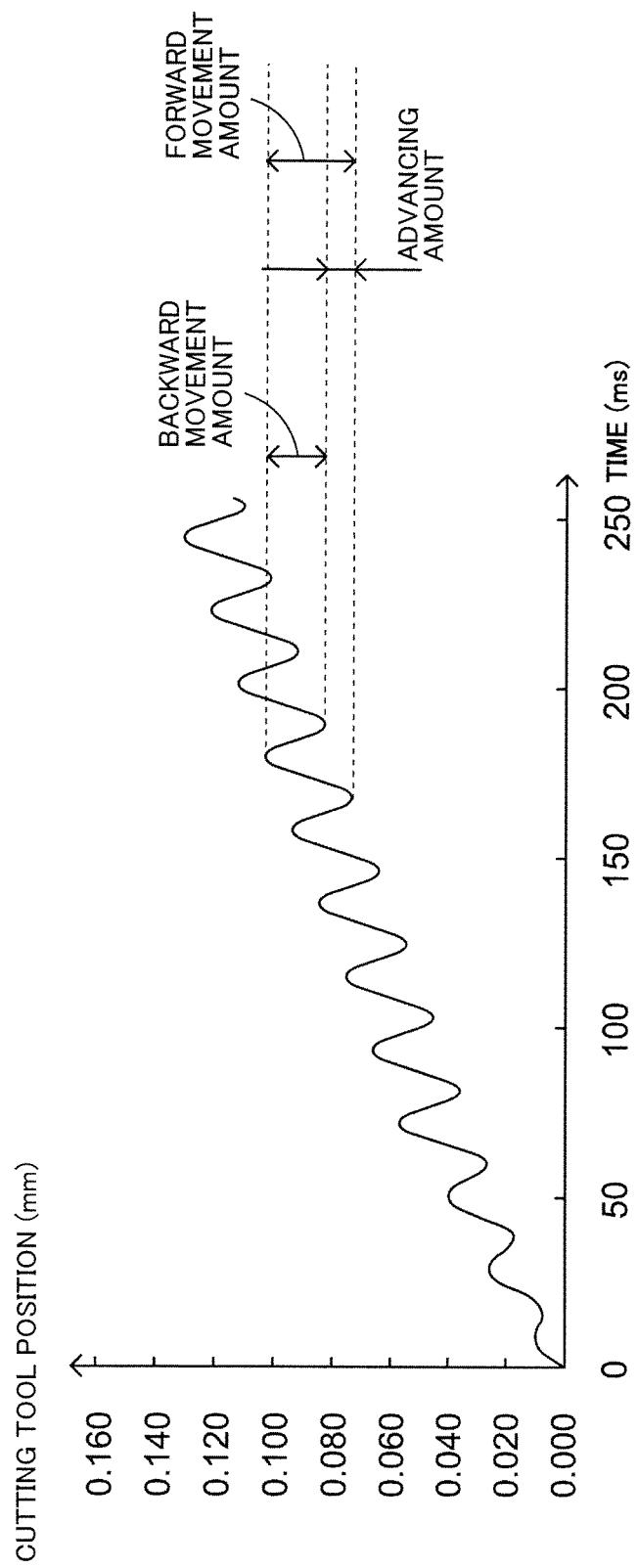

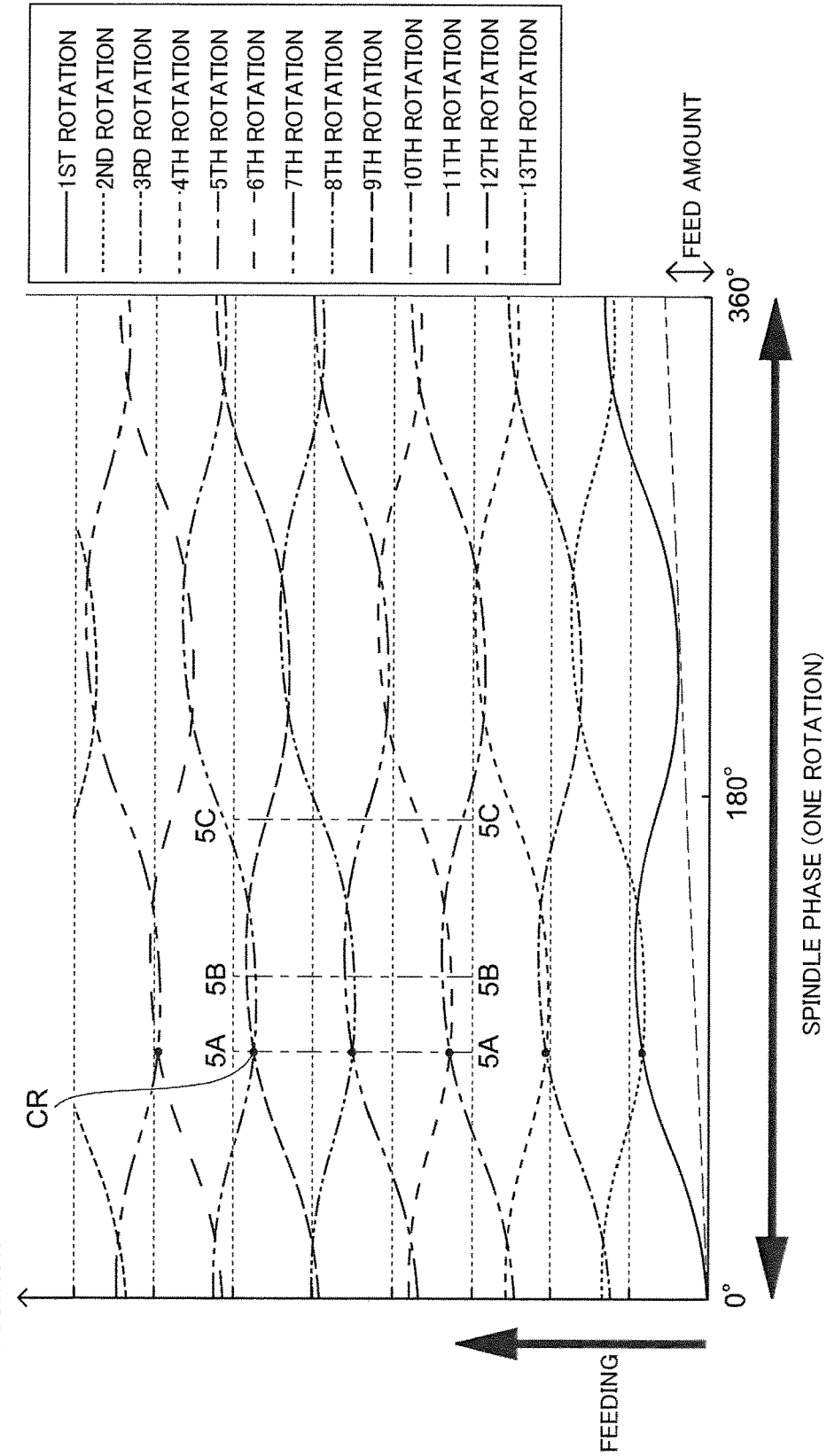

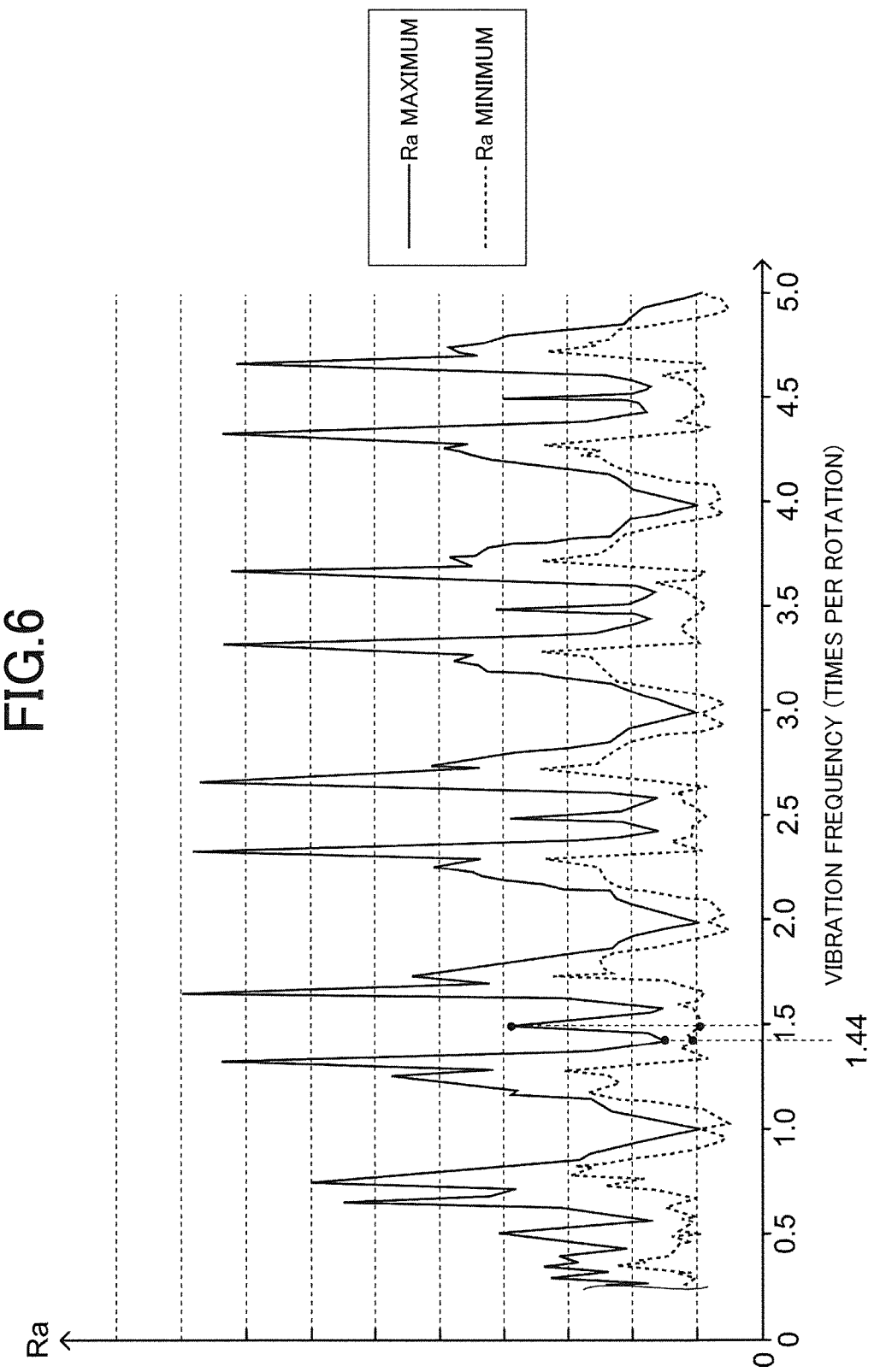

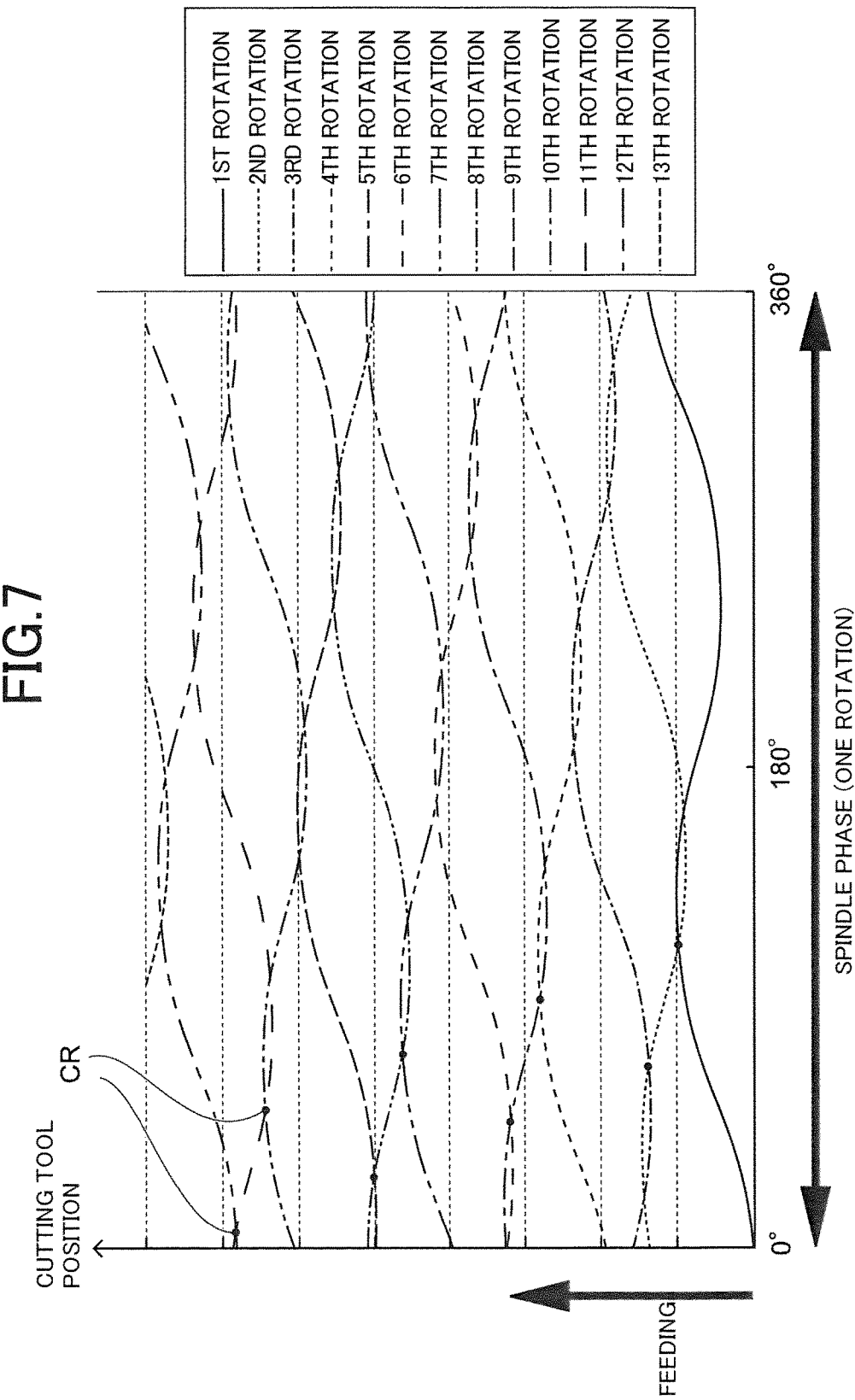

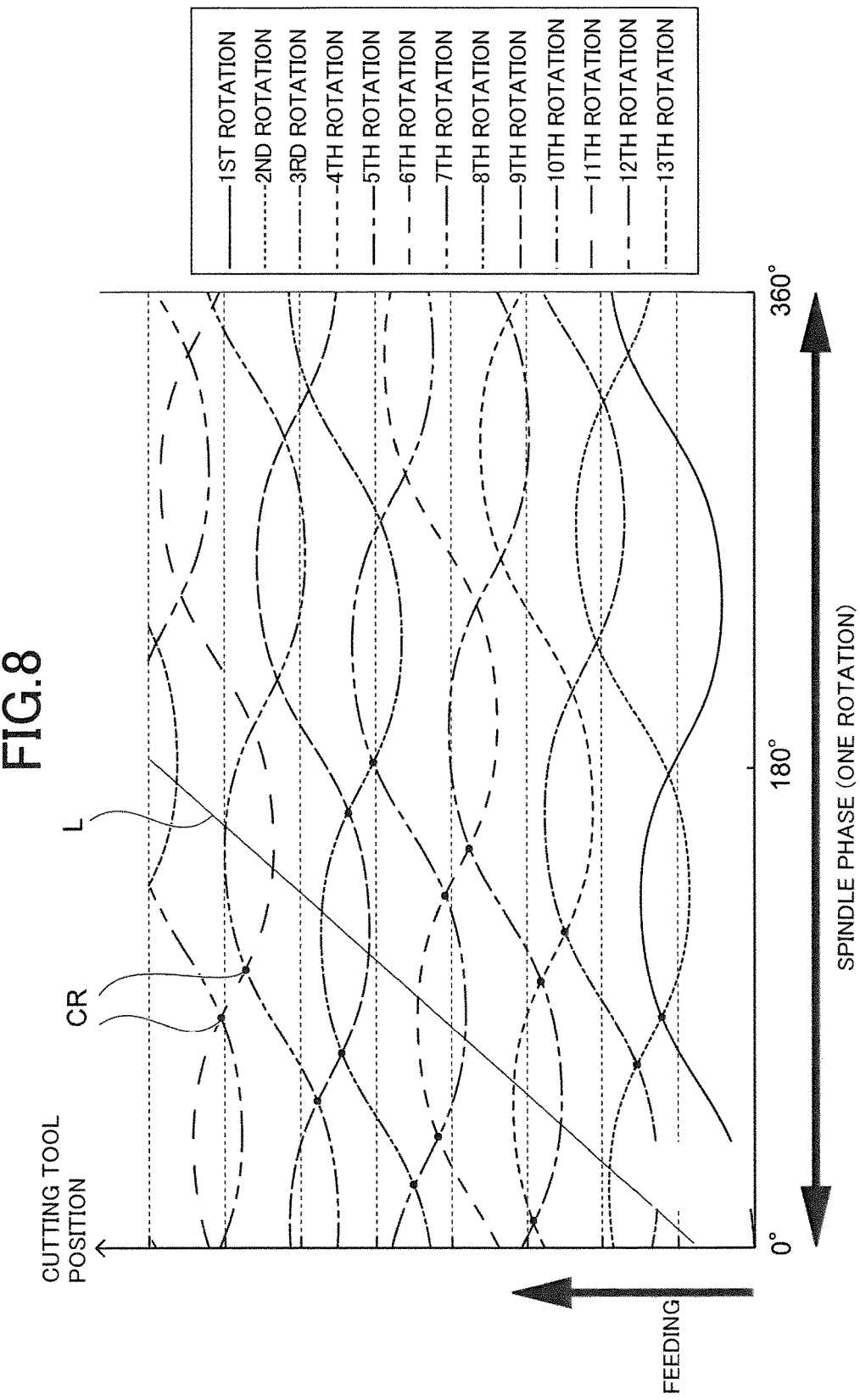

MACHINE TOOL AND CONTROL APPARATUS OF THE MACHINE TOOL

FIELD OF THE INVENTION

The present invention relates to a machine tool that machines a workpiece while sequentially separating a chip generated during a cutting work, and also relates to a control apparatus of the machine tool.

BACKGROUND OF THE INVENTION

Conventionally, a machine tool is known that includes a workpiece holding unit to hold a workpiece, a tool rest to hold a cutting tool that cuts the workpiece, a feeding unit to feed the cutting tool toward the workpiece in a predetermined feeding direction via relative movement between the workpiece holding unit and the tool rest, a vibration unit to cause relative reciprocal vibration between the workpiece holding unit and the tool rest so that the cutting tool is fed in the feeding direction while reciprocally vibrating in the feeding direction, and a rotating unit to cause relative rotation between the workpiece and the cutting tool. An example of such a machine tool is described in paragraphs 0073 and 0078 and FIG. 7 of U.S. Patent Publication 2014/0102268, published Apr. 17, 2014.

A control apparatus of this machine tool drives and controls the rotating unit, the feeding unit, and the vibration unit and makes the machine tool machine the workpiece via relative rotation between the workpiece and the cutting tool and via the feeding of the cutting tool toward the workpiece with the reciprocal vibration in the feeding direction.

SUMMARY OF THE INVENTION

Although the above-described conventional cutting tool separates a chip with the cutting tool by vibrating the cutting tool, there is a problem that a finished workpiece is not always good in terms of roundness of the workpiece, or in terms of visual appearance and roughness of a machined surface of the workpiece.

Thus, it is an object of the present invention, which has been achieved for addressing the above problem of the conventional art, to provide a machine tool that is capable, in addition to sequentially separating a chip generated from a workpiece, to improving the roundness of a finished workpiece and improving the visual appearance and roughness of a machined surface of the workpiece, and a control apparatus of the machine tool.

According to a first aspect of the present invention, the above problem is addressed by a machine tool including a workpiece holding unit to hold a workpiece, a tool rest to hold a cutting tool that cuts the workpiece, a feeding unit to feed the cutting tool toward the workpiece in a predetermined feeding direction via relative movement between the workpiece holding unit and the tool rest, a vibration unit to cause relative reciprocal vibration between the workpiece holding unit and the tool rest and to make a cutting portion during forward movement of the vibration overlap with a cutting portion during backward movement of the reciprocal vibration, and a rotating unit to cause relative rotation between the workpiece and the cutting tool, the machine tool being capable of cutting the workpiece via the relative rotation between the workpiece and the cutting tool and via the feeding of the cutting tool toward the workpiece with the reciprocal vibration in the feeding direction, wherein the machine tool includes a vibration frequency setting unit to set vibration frequency of the reciprocal vibration with respect to one relative rotation when machining the workpiece so that intersections of paths of the cutting tool during the forward movement and the backward movement are dispersed on a circumferential surface of the workpiece. Here, "dispersed" means that an intersection between a path of the cutting tool in the nth rotation and a path of the cutting tool in the n+1th rotation and an intersection between a path of the cutting tool in the n+1st rotation and a path of the cutting tool in the n+2nd rotation and a path of the cutting tool in the n+3rd rotation are located out of alignment with each other in the direction of the relative rotation. That is, intersections between paths of the cutting tool are not gathered to a particular phase of the relative rotation but are dispersed in the direction of the relative rotation.

According to a second aspect of the present invention, the above problem is further addressed by the machine tool according to first aspect, wherein the vibration frequency setting unit sets the vibration frequency on the basis of the difference between a maximum value and a minimum value of roughness of a machined surface of the workpiece or on the basis of the maximum value.

According to a third aspect of the present invention, the above problem is further addressed by the machine tool according to first or second aspect, wherein the machine tool includes an amplitude setting unit to set amplitude of the reciprocal vibration.

According to a fourth aspect of the present invention, the above problem is addressed by a control apparatus of a machine tool including a workpiece holding unit to hold a workpiece, a tool rest to hold a cutting tool that cuts the workpiece, a feeding unit to feed the cutting tool toward the workpiece in a predetermined feeding direction via relative movement between the workpiece holding unit and the tool rest, a vibration unit to cause relative reciprocal vibration between the workpiece holding unit and the tool rest and to make a cutting portion during forward movement of the vibration overlap with a cutting portion during backward movement of the reciprocal vibration, and a rotating unit to cause relative rotation between the workpiece and the cutting tool, the machine tool being capable of cutting the workpiece via the relative rotation between the workpiece and the cutting tool and via the feeding of the cutting tool toward the workpiece with the reciprocal vibration in the feeding direction, wherein the control apparatus includes a vibration frequency setting unit to set vibration frequency of the reciprocal vibration with respect to one relative rotation when machining the workpiece so that intersections of paths of the cutting tool during the forward movement and the backward movement are dispersed on a circumferential surface of the workpiece.

According to the machine tool of the first aspect of the present invention, the intersections of paths of the cutting tool are dispersed in the direction of the relative rotation, making small concave and convex portions on the machined surface of the workpiece being uniformly dispersed in the direction of the relative rotation. Thus, it is possible to improve the roundness of the finished workpiece and improve the visual appearance and roughness of the machined surface of the workpiece.

According to the machine tool of the second aspect of the present invention, a value of the vibration frequency is determined on the basis of the roughness of the machined surface of the workpiece. Thus, it is possible to avoid unexpected deterioration of the roughness of the machined surface due to modification of the vibration frequency.

According to the machine tool of the third aspect of the present invention, the intersections of paths of the cutting tool are dispersed in the feeding direction, making small concave and convex portions on the machined surface of the workpiece being uniformly dispersed in the feeding direction. Thus, it is possible to further improve the visual appearance and roughness of the machined surface of the workpiece.

According to the control apparatus of the machine of the fourth aspect of the present invention, the same effects as the first aspect of the present invention can be achieved with a control apparatus of a machine tool.

BRIEF DESCRIPTION OF THE DRAWINGS

FIG. 2 is a schematic diagram illustrating the relationship between a cutting tool and a workpiece in an embodiment of the present invention.

FIG. 3 is a diagram illustrating reciprocal vibration and a position of the cutting tool in a Z-axis direction in an embodiment of the present invention.

FIG. 4 is a diagram illustrating the relationship between paths of the cutting tool in the first rotation, the second rotation, the third rotation, and so on, of a spindle when vibration frequency is 1.5.

FIG. 6 is a diagram illustrating the relationship between arithmetic average roughness Ra of an outer circumferential machined surface of the workpiece calculated from vibration frequency of the reciprocal vibration per rotation of the spindle and the vibration frequency.

FIG. 7 is a diagram illustrating the relationship between paths of the cutting tool in the first rotation, the second rotation, the third rotation, and so on, of the spindle when the vibration frequency is 1.44 and amplitude-feed ratio is 1.0.

FIG. 8 is a diagram illustrating the relationship between paths of the cutting tool in the first rotation, the second rotation, the third rotation, and so on, of the spindle when the vibration frequency is 1.44 and the amplitude-feed ratio is 2.0.

DETAILED DESCRIPTION OF THE PREFERRED EMBODIMENTS

A machine tool and a control apparatus of the machine tool as an aspect of the present invention may be embodied in any manner as long as the machine tool or the control apparatus is capable of improving the roundness of a finished workpiece and improving the visual appearance and roughness of a machined surface of the workpiece because the machine tool or the control apparatus includes a vibration frequency setting unit to set vibration frequency of the reciprocal vibration with respect to one relative rotation when machining the workpiece so that intersections of paths of the cutting tool during the forward movement and the backward movement are dispersed on a circumferential surface of the workpiece.

Figure 1:
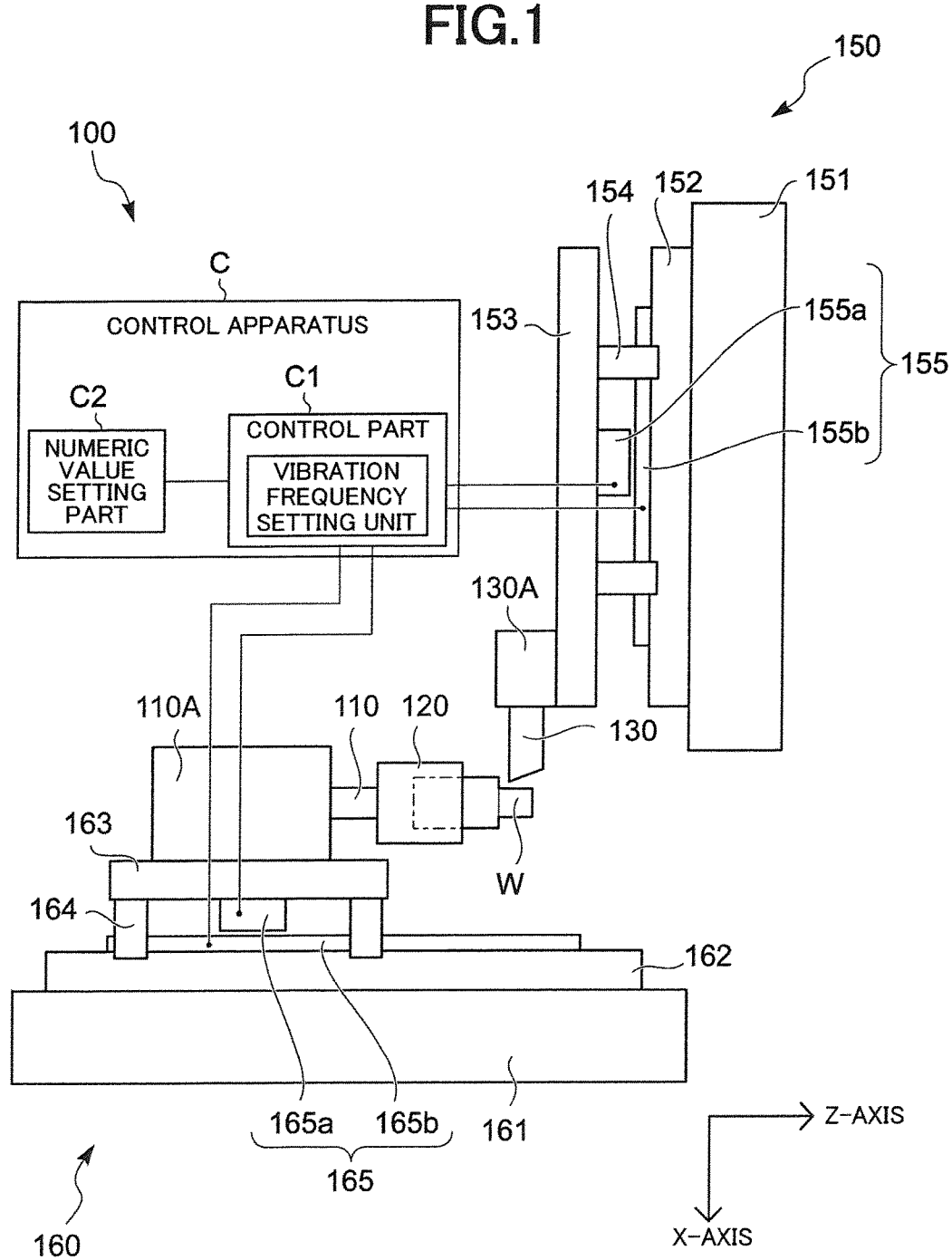
FIG. 1 is a schematic diagram illustrating a machine tool as an embodiment of the present invention.

FIG. 1 is a diagram illustrating a machine tool 100 having a control apparatus C as an embodiment of the present invention. The machine tool 100 includes a spindle 110 as a rotating unit and a cutting tool rest 130A as a tool rest. The spindle 110 has a chuck 120 provided at a tip thereof as a workpiece holding unit. A workpiece W is held by the spindle 110 via the chuck 120. The spindle 110 is supported by a spindle stock 110A so as to be rotatably driven by a spindle motor that is not shown.

The spindle stock 110A is mounted on a bed side of the machine tool 100 so as to be movable in a Z-axis direction, which is an axis direction of the spindle 110, by a Z-axis direction feeding mechanism 160. The spindle 110 moves in the Z-axis direction by the Z-axis direction feeding mechanism 160 via the spindle stock 110A. The Z-axis direction feeding mechanism 160 constitutes a spindle moving mechanism for moving the spindle 110 in the Z-axis direction.

The Z-axis direction feeding mechanism 160 includes a base 161, which is integral with a side on which the Z-axis direction feeding mechanism 160 is fixed, such as the bed side, and a Z-axis direction guide rail 162 provided on the base 161 so as to extend in the Z-axis direction. A Z-axis direction feeding table 163 is slidably supported on the Z-axis direction guide rail 162 via a Z-axis direction guide 164. A mover 165a of a linear servo motor 165 is provided on the side of the Z-axis direction feeding table 163, and a stator 165b of the linear servo motor 165 is provided on the side of the base 161.

The spindle stock 110A is mounted on the Z-axis direction feeding table 163, and the Z-axis direction feeding table 163 is driven by the linear servo motor 165 to move in the Z-axis direction. Due to the movement of the Z-axis direction feeding table 163, the spindle stock 110A moves in the Z-axis direction, making the spindle 110 move in the Z-axis direction.

A cutting tool 130, such as a bite, for cutting the workpiece W is attached to the cutting tool rest 130A. The cutting tool rest 130A is provided on a bed side of the machine tool 100 so as to be movable in an X-axis direction, which is perpendicular to the Z-axis direction, and in a Y-axis direction, which is perpendicular to both the Z-axis direction and the X-axis direction, by an X-axis direction feeding mechanism 150 and a Y-axis direction feeding mechanism that is not illustrated. The X-axis direction feeding mechanism 150 and the Y-axis direction feeding mechanism constitute a tool rest moving mechanism for moving the cutting tool rest 130A in the X-axis direction and the Y-axis direction with respect to the spindle 110.

The X-axis direction feeding mechanism 150 includes a base 151, which is integral with a side on which the X-axis direction feeding mechanism 150 is fixed, and an X-axis direction guide rail 152 provided on the base 151 so as to extend in the X-axis direction. An X-axis direction feeding table 153 is slidably supported on the X-axis direction guide rail 152 via an X-axis direction guide 154.

A mover 155a of a linear servo motor 155 is provided on the side of the X-axis direction feeding table 153, and a stator 155b of the linear servo motor 155 is provided on the side of the base 151. The X-axis direction feeding table 153 is driven by the linear servo motor 155 to move in the X-axis direction. The Y-axis direction feeding mechanism is structurally similar to the X-axis direction feeding mechanism 150, except being arranged in the Y-axis direction. Thus, the detailed description and illustration of the Y-axis direction feeding mechanism are omitted.

In FIG. 1, the X-axis direction feeding mechanism 150 is mounted on the bed side via the Y-axis direction feeding mechanism that is not shown, and the cutting tool rest 130A is mounted on the X-axis direction feeding table 153. The cutting tool rest 130A moves in the X-axis direction by being driven by the X-axis direction feeding table 153, and also moves in the Y-axis direction by being driven by the Y-axis direction feeding mechanism, which operates similarly to the X-axis direction feeding mechanism 150.

Alternatively, the Y-axis direction feeding mechanism that is not shown may be mounted on the bed side via the X-axis direction feeding mechanism 150, and the cutting tool rest 130A may be mounted on the side of the Y-axis direction feeding mechanism. The structure for moving the cutting tool rest 130A in the X-axis direction and the Y-axis direction by the X-axis direction feeding mechanism and the Y-axis direction feeding mechanism 150 is conventionally known and thus the detailed description and illustration of the structure are omitted.

The tool rest moving mechanism (the X-axis direction feeding mechanism 150 and the Y-axis direction feeding mechanism) and the spindle moving mechanism (the Z-axis direction feeding mechanism 160) operate cooperatively, and the cutting tool 130 attached to the cutting tool rest 130A is fed in any feeding direction with respect to the workpiece W via the movement of the cutting tool rest 130A in the X-axis direction and the Y-axis direction by the X-axis direction feeding mechanism 150 and the Y-axis direction feeding mechanism as well as via the movement of the spindle stock 110A (the spindle 110) in the Z-axis direction by the Z-axis direction feeding mechanism 160.

As illustrated in FIG. 2, the workpiece W is cut with the cutting tool 130 into any shape by feeding the cutting tool 130 in any feeding direction with respect to the workpiece W by a feeding unit consisting of the spindle moving mechanism and the tool rest moving mechanism.

In this embodiment, both the spindle stock 110A and the cutting tool rest 130A are movable. Alternatively, the spindle stock 110A may be fixed on the bed side of the machine tool 100 and the tool rest moving mechanism may be configured to move the cutting tool rest 130A in the X-axis direction, the Y-axis direction, and the Z-axis direction. In the latter case, the feeding unit may be consist of the tool rest moving mechanism that moves the cutting tool rest 130A in the X-axis direction, the Y-axis direction, and the Z-axis direction, and the cutting tool 130 may be fed toward the workpiece W by moving the cutting tool rest 130A with respect to the spindle 110 that is fixedly positioned and rotatably driven.

Also, the cutting tool rest 130A may be fixed on the bed side of the machine tool 100 so as to be not movable and the spindle moving mechanism may be configured to move the spindle stock 110A in the X-axis direction, the Y-axis direction, and the Z-axis direction. In this case, the feeding unit may be consist of the spindle moving mechanism that moves the spindle stock 110A in the X-axis direction, the Y-axis direction, and the Z-axis direction, and the cutting tool 130 may be fed toward the workpiece W by moving the spindle stock 110A with respect to the cutting tool rest 130A that is fixedly positioned. Also, although the present embodiment is configured so that the workpiece W is rotated with respect to the cutting tool 130, the cutting tool 130 may be rotated with respect to the workpiece W.

The rotation of the spindle 110, the Z-axis direction feeding mechanism 160, the X-axis direction feeding mechanism 150, and the Y-axis direction feeding mechanism are driven and controlled by a control part C1 of the control apparatus C. The control part C1 includes a vibration control unit to control so that the spindle stock 110A or the cutting tool rest 130A moves in any one of the X-axis direction, the Y-axis direction, and the Z-axis direction while the spindle 110 or the cutting tool 130 reciprocally vibrates in the any one of the X-axis direction, the Y-axis direction, and the Z-axis direction by utilizing one of the feeding mechanisms as a vibration unit.

As illustrated in FIG. 3, due to the control of the control part C1, each of the feeding mechanisms forwardly moves the spindle 110 or the cutting tool rest 130A forwardly (forward movement) for a predetermined forward movement amount and then backwardly moves the spindle 110 or the cutting tool rest 130A backwardly (backward movement) for a predetermined backward movement amount in each reciprocal vibration, so that the spindle 110 or the cutting tool rest 130A moves in a respective direction for an advancing amount that is equal to the difference between the forward movement amount and the backward movement amount. By doing so, the feeding mechanisms cooperatively feed the cutting tool 130 toward the workpiece W in a feeding direction, which in this case is the Z-axis direction.

Due to the Z-axis direction feeding mechanism 160, the X-axis direction feeding mechanism 150, and the Y-axis direction feeding mechanism, the machine tool 100 machines the workpiece W by feeding the cutting tool 130 in the feeding direction for a feed amount, which is equal to the total of the advancing amount as the spindle rotates once, that is, a spindle phase changes from 0 degree to 360 degrees, while reciprocally vibrating the cutting tool 130 in the feeding direction.

If the spindle stock 110A (spindle 110) or the cutting tool rest 130A (cutting tool 130) moves with the reciprocal vibration while the workpiece W rotates for machining the workpiece W with the cutting tool 130 into a predetermined shape, a circumferential surface of the workpiece W is cut sinusoidally as illustrated in FIG. 4. The feed amount is represented as the amount of change of the position illustrated with a virtual line (dashed-dotted line) that passes the valley of the sinusoidal waveform as the spindle phase changes from 0 degree to 360 degrees.

One example will now be described in which vibration frequency N of the spindle stock 110A (spindle 110) or the cutting tool rest 130A with respect to one rotation of the workpiece W is 1.5 (the vibration frequency N=1.5), as illustrated in FIG. 4.

In this case, with respect to the lowest point of the valley of the shape cut with the cutting tool 130 in the first rotation (or the nth rotation: n is an integer equal to or larger than one) of the workpiece (or the peak of the solid line waveform), the lowest point of the valley of the shape of the circumferential surface of the workpiece cut with the cutting tool 130 in the second rotation (or the n+1th rotation) of the workpiece (or the peak of the dotted line waveform, which is the deepest cutting point of the cutting tool 130 that is fed in the feeding direction) is misaligned in the direction of the spindle phase (horizontal axis of the graph).

Thus, a cutting portion of the forward movement of the cutting tool 130 partially overlaps with a cutting portion of the backward movement of the cutting tool 130. This means that a portion of the circumferential surface of the workpiece W that is cut during the n+1th rotation includes a portion the circumferential surface of the workpiece W that has already been cut during the nth rotation. In this portion, the cutting tool 130 performs an air cut, in which the cutting tool 130 does not cut the workpiece W. Due to this air cut, a chip generated from the workpiece W during a cutting work is sequentially separated. Thus, the machine tool 100 can smoothly machine an outer surface of the workpiece W while separating a chip via the reciprocal vibration of the cutting tool 130 in the feeding direction.

In order to sequentially separate a chip via the reciprocal vibration of the cutting tool 130, a portion of the circumferential surface of the workpiece W that is cut during the n+1th rotation simply needs to include a portion that has already been cut during the nth rotation. In other words, a path of the cutting tool 130 on the circumferential surface of the workpiece W during the backward movement in the n+1th rotation (n is an integer equal to or larger than one) of the workpiece W simply needs to reach a path of the cutting tool 130 on the circumferential surface of the workpiece W in the nth rotation of the workpiece W.

As illustrated in FIG. 4, when the vibration frequency N equals 1.5, intersections CR of the paths of the cutting tool 130 on the workpiece W are aligned in the feeding direction at some predetermined phases of the spindle phase.

Figure 5A:
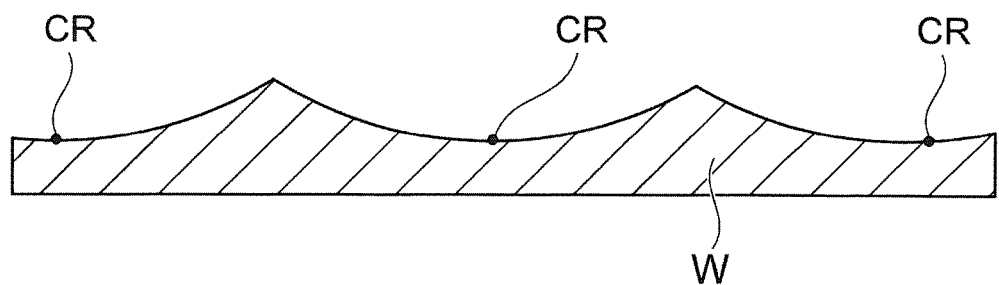
FIG. 5A is a cross-sectional view as seen at the position illustrated as 5A-5A in FIG. 4.
Figure 5B:
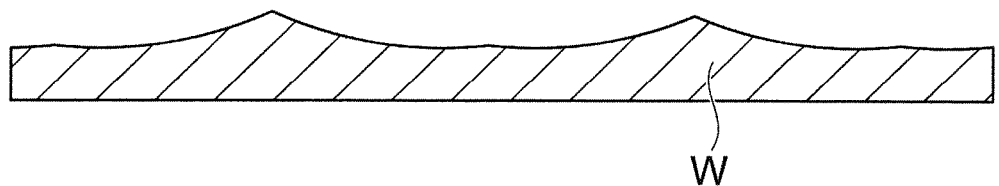
FIG. 5B is a cross-sectional view as seen at the position illustrated as 5B-5B in FIG. 4.
Figure 5C:
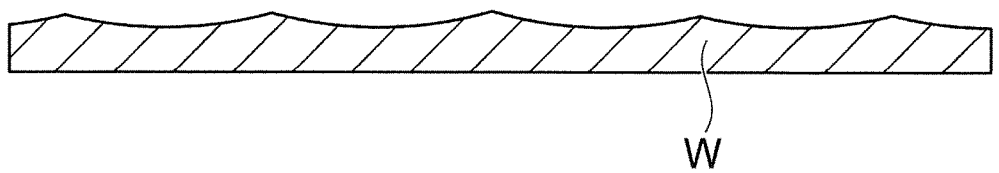
FIG. 5C is a cross-sectional view as seen at the position illustrated as 5C-5C in FIG. 4.

FIG. 5A illustrates 5A-5A cross section in FIG. 4, FIG. 5B illustrates 5B-5B cross section in FIG. 4, and FIG. 5C illustrates 5C-5C cross section in FIG. 4. Each of these figures shows undulation on a machined surface of the workpiece W.

As illustrated in FIGS. 5A to 5C, when the cutting tool 130 does not vibrate in a radial direction of the workpiece W but vibrates in the Z-axis direction, which in this case is the feed direction, with respect to the workpiece W, a part of the workpiece W where a tip of the cutting tool 130 passes becomes concave (because a surface of the workpiece W is cut), and a part between paths of the cutting tool 130 becomes convex (because the part is located between parts on the surface of the workpiece W that are cut and is not cut).

As illustrated in FIG. 5A, at the predetermined phase where the intersections CR are aligned (5A-5A in FIG. 4), the distance between the paths of the cutting tool 130 is wider in comparison with FIGS. 5B and 5C, the difference between the convex portion and the concave portion becomes larger in comparison with FIGS. 5B and 5C. [0037] Also, the height of the convex portion becomes higher in comparison with FIGS. 5B and 5C.

The convex portion and the concave portion, which cause surface roughness of a machined surface of the workpiece W, are located in the direction of the spindle phase in various heights. The difference between the convex portion and the concave portion is not uniformly located but eccentrically located.

As illustrated in FIG. 6, an arithmetic average roughness Ra, which is a standard of surface roughness of a machined surface of the workpiece W calculated from the vibration frequency, varies in accordance with the vibration frequency.

In the machine tool 100 of the present embodiment, the control part C1 and a numeric value setting part C2 constitute a setting unit to set the vibration frequency of the reciprocal vibration with respect to one rotation of the spindle as a parameter, and a user sets the feed amount, the number of rotations of the spindle, and the vibration frequency N to the control part C1 via the numeric value setting part C2 or the like. Also, the control part C1 includes a vibration frequency setting unit to set parameters set by the setting unit in accordance with predetermined conditions of vibration cutting described later.

The control part C1 calculates on the basis of parameters or the like set by the setting unit and determines whether the arithmetic average roughness Ra is less than a predetermined allowable value as a predetermined condition. For example, the control part C1 determines whether the difference between the maximum value and the minimum value of the arithmetic average roughness Ra is less than a first predetermined allowable value that has been set, and also determines whether the maximum value of the arithmetic average roughness Ra is less than a second predetermined allowable value that has been set. If one of them is larger than the predetermined allowable value, then the control part C1 sets the vibration frequency N so that both becomes larger than the predetermined allowable values.

FIG. 6 illustrates values of the arithmetic average roughness Ra as a standard of roughness plotted on a graph with the vibration frequency per rotation on the horizontal axis. As one example, when the vibration frequency N equals 1.5, the difference between the maximum value of the Ra (illustrated with a solid line) and the minimum value of the Ra (illustrated with a dotted line) of the circumferential surface of the workpiece is large. The portion representing the maximum value of the Ra when the vibration frequency N equals 1.5 assumes the machined surface of the workpiece illustrated in FIG. 5A, where the difference between the convex portion and the concave portion is large. The portion representing the minimum value of the RA assumes the machined surface of the workpiece illustrated in FIG. 5C, where the difference between the convex portion and the concave portion is small.

The control part C1 modifies the vibration frequency N so that the difference between the maximum value and the minimum value of the arithmetic average roughness Ra becomes smaller (in FIG. 6, the left side from the vibration frequency N=1.5). For example, the control part C1 modifies the vibration frequency N from 1.5 and set the vibration frequency N to 1.44, where the difference becomes the smallest. Due to the setting of the vibration frequency by the control part C1, the intersections CR of the paths of the cutting tool 130 are dispersed in the direction of the spindle phase (that is, on the circumferential surface of the workpiece) as illustrated in FIG. 7. In other words, the intersections CR are located in a mutually misaligned manner in the direction of the spindle phase, and coarse/fine dispersion of the intersections CR of the paths of the cutting tool 130 on the circumferential surface of the workpiece are made uniform in the direction of the spindle phase. That is, the difference between the convex portion and the concave portion on the machined surface of the workpiece becomes smaller. According to this setting of the vibration frequency, the roughness of the machined surface of the workpiece can be improved without significantly changing the vibration frequency N, because the amount of change of the vibration frequency N is rather small between before and after setting the vibration frequency.

Although the arithmetic average roughness Ra is used for representing the roughness of the machined surface of the workpiece, another standard of roughness (such as maximum roughness Rz) may be used.

In addition to the setting of the vibration frequency by the control part C1, the machine tool 100 includes an amplitude setting unit to set the amplitude of the reciprocal vibration. Thus, as illustrated in FIG. 8, the intersections CRs CR of the paths of the cutting tool 130 are also dispersed in the feeding direction, and coarseness/fineness of the paths of the cutting tool 130 is also dispersed in the feeding direction. That is, the intersections CRs CR of the paths of the cutting tool 130 are located in a mutually misaligned manner in the feeding direction as well. Thus, not only is the coarse/fine dispersion of the intersections CR made uniform in the direction of the spindle phase, but the coarse/fine dispersion is also made uniform in the feeding direction, so that the difference between paths of the cutting tool 130 can be reduced in the feeding direction.

Specifically, if the control part C1 determines the amplitude of the reciprocal vibration on the basis of the amplitude-feed ratio calculated by dividing the amplitude by the feed amount, the amplitude of the reciprocal vibration is changed by changing the amplitude-feed ratio. For example, the amplitude-feed ratio may be changed from 1.0 to 2.0. By doing so, the intersections CRs CR of the paths of the cutting tool 130 are dispersed both in the direction of the spindle phase and the feeding direction, and the distance between the paths of the cutting tool 130 is reduced along a predetermined direction on the machined surface of the workpiece (such as the direction of a line L illustrated in FIG. 8), lowering the above-mentioned convex portions and dispersing the coarseness/fineness of the convex portions. Thus, the roughness of the machined surface of the workpiece is even more improved.

The invention claimed is:

1. A machine tool comprising:
   a workpiece holding unit to hold a workpiece;
   a tool rest to hold a cutting tool that cuts the workpiece;
   a feeding unit comprising a workpiece moving mechanism to move the workpiece held by the workpiece holding unit and a tool rest moving mechanism to move the tool rest to feed the cutting tool toward the workpiece in a predetermined feeding direction by moving the workpiece moving mechanism and/or the tool rest moving mechanism;
   a vibration unit to cause relative reciprocal vibration between the workpiece holding unit and the tool rest and to make a cutting portion during forward movement of the vibration overlap with a cutting portion during backward movement of the reciprocal vibration; and
   a rotating unit to cause the cutting tool to rotate with respect to the workpiece or the workpiece to rotate with respect to the cutting tool,
   the machine tool being capable of cutting the workpiece via the rotation of the workpiece or the cutting tool and via the feeding of the cutting tool toward the workpiece with reciprocal vibration in the feeding direction,
   wherein the machine tool comprises a vibration frequency setting unit to set vibration frequency of the reciprocal vibration with respect to one rotation of the workpiece or the cutting tool when machining the workpiece based on a difference of heights of concave and convex portions formed on a surface of the workpiece corresponding to paths of the cutting tool during the forward movement and the backward movement and having predetermined heights so that the concave and convex portions are dispersed respectively at different phase positions of the workpiece.

2. The machine tool according to claim 1, wherein the machine tool comprises an amplitude setting unit to set amplitude of the reciprocal vibration.

3. The machine tool according to claim 1, wherein the vibration frequency setting unit sets the vibration frequency on the basis of the difference between a maximum value and a minimum value of roughness of a machined surface of the workpiece or on the basis of the maximum value.

4. The machine tool according to claim 3, wherein the machine tool comprises an amplitude setting unit to set amplitude of the reciprocal vibration.

5. A control apparatus of a machine tool comprising a workpiece holding unit to hold a workpiece; a tool rest to hold a cutting tool that cuts the workpiece; a feeding unit comprising a workpiece moving mechanism to move the workpiece held by the workpiece holding unit and a tool rest moving mechanism to move the tool rest to feed the cutting tool toward the workpiece in a predetermined feeding direction by moving the workpiece moving mechanism and/or the tool rest moving mechanism; a vibration unit to cause relative reciprocal vibration between the workpiece holding unit and the tool rest and to make a cutting portion during forward movement of the vibration overlap with a cutting portion during backward movement of the reciprocal vibration; and a rotating unit to cause the cutting tool to rotate with respect to the workpiece or the workpiece to rotate with respect to the cutting tool, the machine tool being capable of cutting the workpiece via the rotation of the workpiece or the cutting tool and via the feeding of the cutting tool toward the workpiece with the reciprocal vibration in the feeding direction;
   wherein the control apparatus of the machine tool comprises a control part to control the tool rest moving mechanism and the work moving mechanism and a numeric value setting part to set vibration frequency of the reciprocal vibration with respect to one rotation of the workpiece or the cutting tool when machining the workpiece; and
   wherein the control part further comprises a vibration frequency setting unit that changes the vibration frequency set by the numeric value setting part based on a difference of heights of concave and convex portions formed on a surface of the workpiece corresponding to paths of the cutting tool during the forward movement and the backward movement and having predetermined heights so that the concave and convex portions are dispersed respectively at different phase positions of the workpiece.

* * * * *